US012782103B2

United States Patent
(12) United States Patent — Park et al.

(10) Patent No.: US 12,782,103 B2
(45) Date of Patent: Nov. 3, 2026

(54) APPARATUS AND METHOD FOR MEASURING A MAGNETIC ANGLE

(71) Applicant: Infineon Technologies AG, Neubiberg (DE)

(72) Inventors: Joo Il Park, Sungnam (KR); Richard Heinz, Munich (DE); Stephan Leisenheimer, Oberhaching (DE); Severin Neuner, Valley (DE); Hyun Jeong Kim, Seoul (KR)

(73) Assignee: Infineon Technologies AG, Neubiberg (DE)

(*) Notice: Subject to any disclaimer, the term of this patent is extended or adjusted under 35 U.S.C. 154(b) by 338 days.

(21) Appl. No.: 18/419,050

(22) Filed: Jan. 22, 2024

(65) Prior Publication Data

US 2024/0247926 A1 Jul. 25, 2024

(30) Foreign Application Priority Data

Jan. 23, 2023 (DE) ........................ 102023101505.2

(51) Int. Cl.

| | |
|---|---|
| ***G01B 7/30*** | (2006.01) |
| ***G01D 5/14*** | (2006.01) |
| ***G01D 5/16*** | (2006.01) |

(52) U.S. Cl.
CPC ............... *G01B 7/30* (2013.01); *G01D 5/145* (2013.01); *G01D 5/16* (2013.01)

(58) Field of Classification Search
CPC ............. G01B 7/30; G01D 5/145; G01D 5/16
See application file for complete search history.

(56) References Cited

U.S. PATENT DOCUMENTS

| | | | | |
|---|---|---|---|---|
| 11,448,713 | B1 * | 9/2022 | Ostermann | G01R 33/0005 |
| 11,719,528 | B2 * | 8/2023 | Park | G01B 7/30 324/207.21 |
| 2006/0255796 | A1 | 11/2006 | Shoji | |
| 2009/0206827 | A1 | 8/2009 | Aimuta et al. | |
| 2011/0246133 | A1 | 10/2011 | Harada et al. | |
| 2012/0313635 | A1 | 12/2012 | Daubert | |
| 2013/0238278 | A1 | 9/2013 | Shoemaker et al. | |
| 2016/0123771 | A1 | 5/2016 | David et al. | |
| 2017/0356967 | A1 * | 12/2017 | Romero | G01R 33/0029 |
| 2020/0209017 | A1 | 7/2020 | Eagen et al. | |

FOREIGN PATENT DOCUMENTS

| | | | |
|---|---|---|---|
| CN | 206489256 | U | 9/2017 |
| EP | 2264476 | A1 | 12/2010 |
| EP | 2843370 | A1 | 3/2015 |
| JP | 2020106425 | A | 7/2020 |

* cited by examiner

*Primary Examiner* — Reena Aurora
(74) *Attorney, Agent, or Firm* — Harrity & Harrity, LLP

(57) ABSTRACT

A magnetic angle switch circuit including a magnetic sensor circuit configured to determine a sensor signal indicative of an angle of a magnetic field; and a switch circuit configured to compare the sensor signal against a threshold signal indicative of a predefined angular threshold, and output a binary signal indicative of whether the angle of the magnetic field exceeds or falls below the predefined angular threshold.

20 Claims, 4 Drawing Sheets

APPARATUS AND METHOD FOR MEASURING A MAGNETIC ANGLE

CROSS-REFERENCE TO RELATED APPLICATION

This application claims priority to German Patent Application No. 102023101505.2 filed on Jan. 23, 2023, the content of which is incorporated by reference herein in its entirety.

TECHNICAL FIELD

The present disclosure relates to magnetic switch circuits and, more particularly, to magnetic angle switch circuits which may be used as brake light sensors, for example.

BACKGROUND

In many areas of technology, switching devices may be used to trigger a certain function when a certain operating parameter of an operating device is present. For example, such switching devices in the form of brake light sensors or switches may be used in motor vehicles. They may monitor an actuation of a brake pedal of a motor vehicle. Such brake light switches have the function of activating the brake lights of the motor vehicle. The brake pedal acts on a position indicator of the brake light switch, whereby its position within the brake light switch correlates with the position of the brake pedal.

In an example of a conventional brake light switch, a movement of the brake pedal may be detecting, with a Hall sensor, a magnetic field that changes in dependence on the movement. When the brake pedal moves, a ferromagnetic area of the brake pedal may change its position relative to a fixed magnet, which in turn is in a certain unchanging relative position to a Hall sensor. A change in the magnetic field in the Hall sensor due to the movement of the brake pedal produces a different output signal from the Hall sensor than when the brake pedal is at rest.

An output of Hall sensors typically depends on a magnetic field strength which may render Hall-sensor-based brake light sensors sensitive to sensitivity and offset errors as well as temperature.

Thus, there may be a desire for improved magnetic switches.

SUMMARY

This need is met by apparatuses and methods in accordance with the appended claims. Potentially advantageous implementations are addressed by the dependent claims.

According to a first aspect, the present disclosure proposes a magnetic angle switch circuit. The magnetic angle switch circuit includes a magnetic sensor circuit which is configured to determine a sensor signal indicative of an angle of a magnetic field. The magnetic angle switch circuit further includes a switch circuit which is configured to compare the sensor signal against a threshold signal. The threshold signal is indicative of a predefined angular threshold. The switch circuit is further configured to output a binary signal indicative of whether the angle of the magnetic field exceeds or falls below the predefined angular threshold. Thus, the proposed magnetic angle switch circuit uses a direction of the magnetic field instead of an absolute magnetic field value to control the output of the switch. This may render the proposed magnetic angle switch inherently immune to changes of the absolute magnetic field, for example, due to sensitivity and offset errors and/or temperature dependencies.

In some implementations, the magnetic sensor circuit is configured to determine the sensor signal being indicative of at least one trigonometric function of the angle. The trigonometric function includes the sine and/or the cosine of the angle. With at least one trigonometric function of the angle, it is possible to determine the angle. For example, an inverse trigonometric function (e.g., arcsin-, arccos- or arctan-function) may be determined.

In some implementations, the magnetic sensor circuit is configured to determine a first sensor signal indicative of a first trigonometric function of the angle (e.g., sin(.)), determine a second sensor signal indicative of a second trigonometric function of the angle (e.g., cos(.)), and to determine the sensor signal indicative of the angle based on the first and second sensor signal (e.g., (.)=arctan(sin(.)/cos(.))).

In some implementations, the magnetic sensor circuit includes at least a first voltage divider circuit including a first magneto-resistor connected in series to a second magneto-resistor. The voltage divider circuit may also be considered as a half bridge circuit. The magneto-resistors may be magneto-resistive elements based on anisotropic magnetoresistance (AMR), giant magnetoresistance (GMR), or preferably based on tunnel magnetoresistance (TMR). Different magneto-resistive effects may be generally abbreviated as xMR. The switch circuit may include at least a first comparator circuit having a first input coupled to a terminal of the magnetic sensor circuit between the first and the second magneto-resistor, and a second input coupled to the threshold signal. In this way, a simple magnetic angle switch circuit with a unique angle range of up to 180° may be implemented.

In some implementations, a first reference magnetization of the first magneto-resistor and a second reference magnetization of the second magneto-resistor differ by 180°. For magneto-resistors, the reference magnetization may be determined by a reference layer or a reference system including multiple layers. The reference layer has its magnetization typically pinned by exchange coupling with an antiferromagnetic layer. By choosing first and second reference magnetization to differ by 180°, a highly sensitive voltage divider (half bridge) may be obtained.

In some implementations, the magnetic sensor circuit further includes a second voltage divider circuit including a third magneto-resistor connected in series to a fourth magneto-resistor. Thus, the first voltage divider circuit and the second voltage divider circuit may be combined to a Wheatstone bridge circuit. The switch circuit may include a second comparator having a first input coupled to a second terminal of the magnetic sensor circuit between the third and the fourth magneto-resistor, and a second input coupled to a second threshold signal indicative of a second predefined angular threshold. In this way, it is possible to provide a full 360° range angle switch.

In some implementations, a third reference magnetization of the third magneto-resistor and a fourth reference magnetization of the third magneto-resistor differ by 180°. The first reference magnetization and third reference magnetization differ by 90° and the second reference magnetization and fourth reference magnetization differ by 90°. In this way, a highly sensitive Wheatstone bridge circuit for measuring the sin- and cos-component of the angle may be obtained.

In some implementations, the magnetic angle switch circuit may further include a logical combiner circuit which is configured to logically combine a first output of the first comparator and a second output of the second comparator to obtain the binary signal. The logical combiner circuit may be configured to logically combine the outputs in accordance with various logical operators, such as a logical "OR", a logical "XOR", a logical "AND", or combinations thereof, for example. Also, other more complex combinations of the first and second outputs may be used.

While the magnetic angle switch circuit may include TMR resistors as the magneto-resistors in accordance with some implementations, other implementations may be directed to the use of Hall sensors. The magnetic sensor circuit may include a first Hall sensor which is configured to determine a first sensor signal indicative of a first magnetic field component of the magnetic field (e.g., x-component) and a second Hall sensor configured to determine a second sensor signal indicative of a second magnetic field component (e.g., y-component) of the magnetic field. The magnetic sensor circuit may be configured to determine the sensor signal based on a combination of the first and second sensor signal.

According to a second aspect, the present disclosure proposes a magnetic angle switch apparatus. The magnetic angle switch apparatus includes a movable magnet causing a magnetic field, an actuator configured to move the movable magnet along a trajectory and a magnetic angle switch circuit of any one of the previous examples at a position in proximity to the trajectory of the movable magnet and configured to output the binary signal in response to the angle of the magnetic field at the position of the magnetic angle switch circuit. Such a magnetic angle switch apparatus may be used as a brake light sensor, for example.

In some implementations, the position and or orientation of the magnetic angle switch circuit with regards to the magnet is adjustable. For example, the position and or orientation of the magnetic angle switch circuit on a printed circuit board (PCB) may be freely determined to fit certain applications.

According to a further aspect, the present disclosure proposes a method for measuring a magnetic angle. The method includes determining a magnetic sensor signal indicative of an angle of a magnetic field, comparing the magnetic sensor signal against a threshold signal indicative of a predefined angular threshold, and outputting a binary signal indicative of whether the angle of the magnetic field exceeds or falls below the predefined angular threshold.

BRIEF DESCRIPTION OF THE DRAWINGS

Some examples of apparatuses and/or methods will be described in the following by way of example only, and with reference to the accompanying figures, in which FIG. 1 schematically shows a magnetic angle switch circuit in accordance with implementations of the present disclosure.

DETAILED DESCRIPTION

Figure 1:
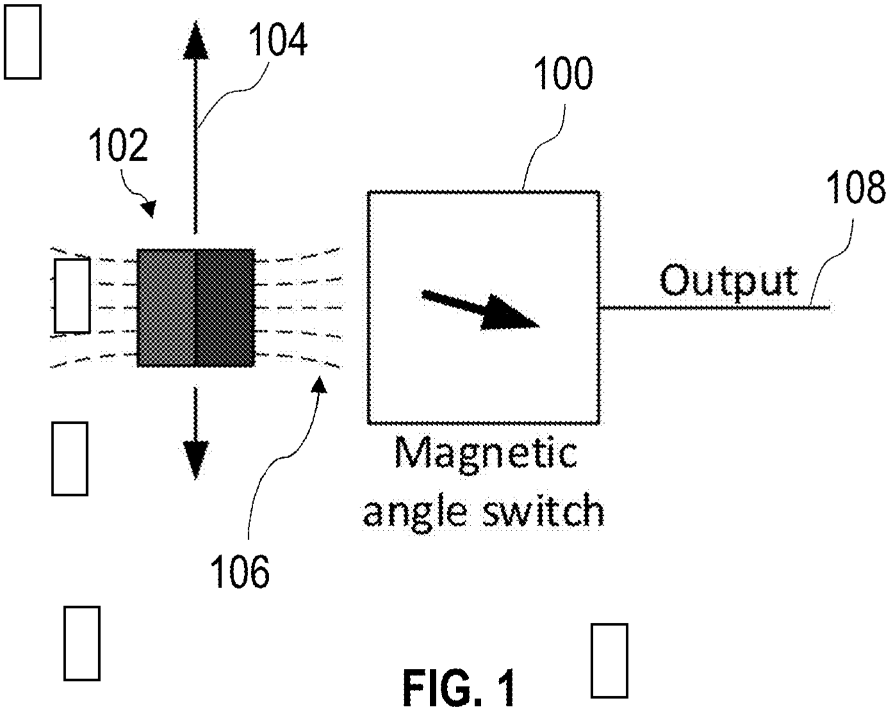

Some examples are now described in more detail with reference to the enclosed figures. However, other possible examples are not limited to the features of these implementations described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 schematically shows a magnetic angle switch circuit 100 in accordance with implementations of the present disclosure.

In the illustrated example, a magnet (e.g., a permanent magnet) 102 may be linearly moved along a straight motion axis 104 (e.g., z-direction). Other motion trajectories are also conceivable. Magnetic angle switch circuit 100 may be placed next to the motion axis 104 and is configured to determine a sensor signal indicative of an angle of a magnetic field 106 generated by magnet 102. That is, magnetic angle switch circuit 100 is configured to measure the angle of magnetic field 106 instead of its strength (absolute value). The angle of the magnetic field 106 may be understood as an angle between a reference direction (e.g., x-, y-, or z-direction) and the direction of magnetic field lines (of magnetic field 106) at a location of the magnetic sensor circuit 110. The reference direction may be determined by a reference magnetization of a magneto-resistive sensor or a current direction of a Hall sensor, for example. In addition, the reference direction may be determined by an orientation and/or position of the magnetic sensor circuit 110 relative to the magnet 102 or motion axis 104.

Magnetic angle switch circuit 100 is further configured to compare the sensor signal (indicative of the magnetic field angle) against a threshold signal indicative of a predefined angular threshold and output a binary signal 108 indicative of whether the angle of the magnetic field 106 exceeds or falls below the predefined angular threshold. That is, the output of magnetic angle switch circuit 100 is not an angle value but a binary signal, like in case of a switch. For example, a "high" signal 108 may indicate that the angle of the magnetic field 106 at magnetic angle switch circuit 100 exceeds the predefined angular threshold, whereas a "low" signal 108 may indicate that the angle of the magnetic field 106 at magnetic angle switch circuit 100 falls below the predefined angular threshold. The predefined angular threshold may be a fixed or freely programmable threshold. In the latter case, the angular threshold may be changed during operation of the magnetic angle switch circuit 100. More than one predefined angular threshold may be used.

Figure 2:
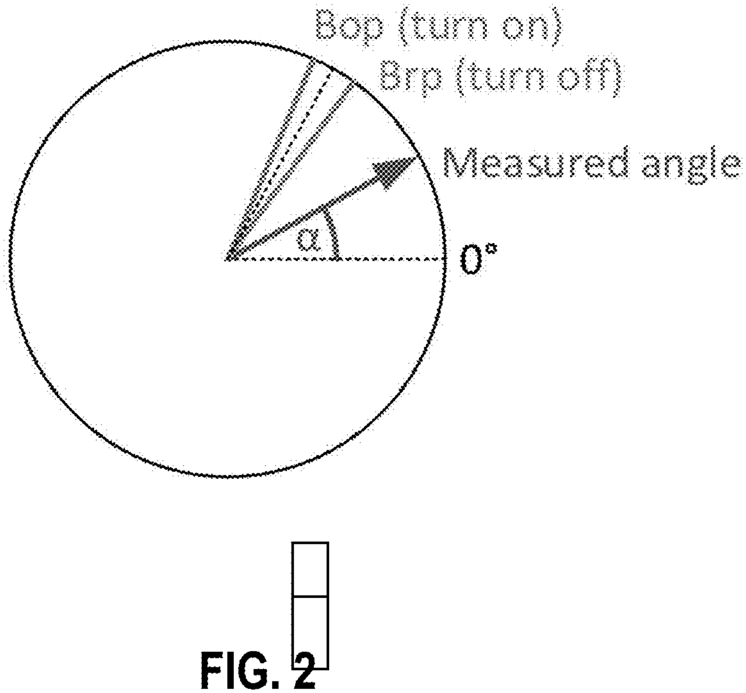
FIG. 2 illustrates an example with two different predefined angular thresholds.

An example with two different predefined angular thresholds $B_{op}$ and $B_{rp}$ (with $B_{op}>B_{rp}$) defining an angular hysteresis is illustrated in FIG. 2. When magnetic angle switch circuit 100 is an "off" state (e.g., binary output signal 108="low"), the predefined angular threshold to turn on magnetic angle switch circuit 100 corresponds to $B_{op}$. That is, magnetic angle switch circuit 100 may be configured to compare the sensor signal (indicative of the angle) against a first threshold signal indicative of first predefined angular threshold $B_{op}$ and to output a "high" signal 108 if the angle $\alpha$ of the magnetic field 106 exceeds the first predefined angular threshold $B_{op}$. On the other hand, when magnetic angle switch circuit 100 is in an "on" state (e.g., binary output signal 108="high"), the predefined angular threshold to turn off magnetic angle switch circuit 100 corresponds to $B_{rp}$. That is, magnetic angle switch circuit 100 may be configured to compare the sensor signal (indicative of the angle) against a second threshold signal indicative of a second predefined angular threshold $B_{rp}$ and to output a "low" signal 108 if the angle $\alpha$ of the magnetic field 106 falls below the second predefined angular threshold $B_{rp}$.

The skilled person having benefit from the present disclosure will appreciate that more complex switching logics may be implemented with more predefined angular threshold and/or more information (e.g., on a rotational direction).

Figure 3:
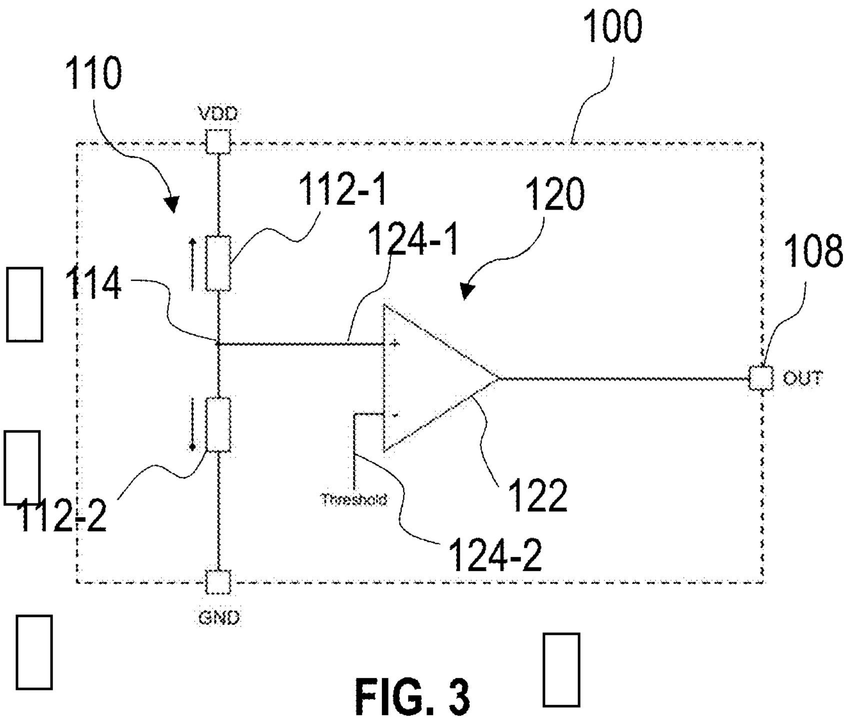
FIG. 3 illustrates a basic implementation example of a magnetic angle switch circuit with xMR sensors in accordance with implementations of the present disclosure.

A basic implementation example of magnetic angle switch circuit 100 is shown in FIG. 3. The circuit design of FIG. 3 may be essentially temperature independent.

Magnetic angle switch circuit 100 of FIG. 3 comprises a magnetic sensor circuit portion 110 and a switch circuit portion 120. Magnetic sensor circuit portion 110 comprises circuit components yielding the sensor signal indicative of the magnetic field angle, while switch circuit portion 120 comprises circuit components yielding the binary output signal 108. In the implementation of FIG. 3, magnetic sensor circuit portion 110 comprises a voltage divider circuit. The voltage divider circuit comprises a first magneto-resistive element 112-1 connected in series to a second magneto-resistive element 112-2. The first magneto-resistive element 112-1 and the second magneto-resistive element 112-2 are connected in series between a supply voltage VDD and ground GND and form one branch of a Wheatstone bridge (half bridge). In some implementations, the first and second magneto-resistive elements 112-1, 112-2 may be implemented as TMR elements with opposite reference magnetizations. When using TMR elements, no further signal amplification of the voltage at sensing node 114 may be required.

In the illustrated example, the reference magnetization of first magneto-resistive element 112-1 points upwards in the drawing, while the reference magnetization of second magneto-resistive element 112-2 points downwards in the drawing. The reference magnetization(s) may determine the reference direction for the angle measurement. The magnetic sensor circuit portion 110 of FIG. 3 is configured to determine the sensor signal (e.g., sensing voltage) at sensing node 114 which is indicative of a strength/direction of a magnetic field component. The sensor signal (voltage) changes with the direction of the magnetic field. The magnetic field component may correspond to a trigonometric function of the magnetic field angle. The trigonometric function may correspond the sine or the cosine of the angle.

The example switch circuit portion 120 of FIG. 3 comprises a comparator circuit 122 having a first input 124-1 (non-inverting input) coupled to sensing node 114 (sensing signal) of the magnetic sensor circuit portion 110 between the first and the second magneto-resistive elements 112-1, 112-2. Comparator circuit 122 also has a second input 124-2 (inverting input) coupled to the threshold signal (e.g., threshold voltage) indicative of the predefined angular threshold. The threshold signal may correspond to a trigonometric function of the predefined angular threshold. The threshold signal can be fixed or set by an external resistor, for example. Comparator circuit 122 may be a device that compares two voltages or currents and outputs a digital (binary) signal 108 indicating which is larger. For example, comparator circuit 122 may comprise an operational amplifier (op-amp) as a high-gain differential amplifier.

The basic magnetic angle switch circuit 100 of FIG. 3 can provide unique angle measurements and switching points in an angular range of 180° and may have low current consumption and small chip size.

Figure 4:
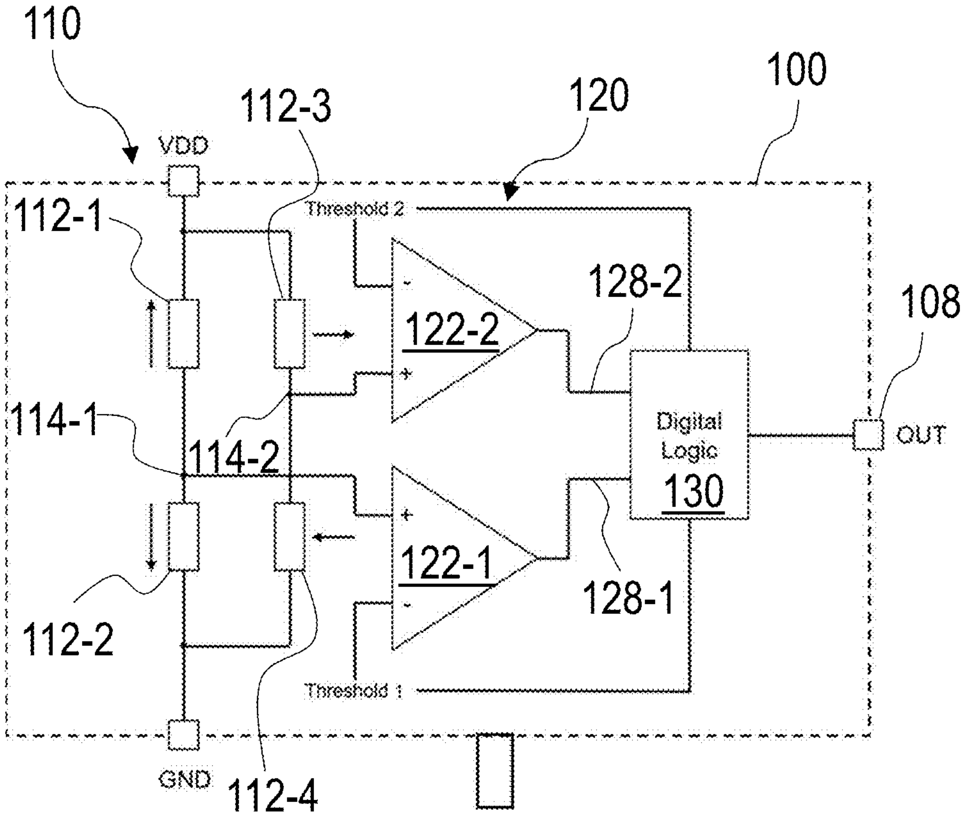
FIG. 4 illustrates a further implementation example of a magnetic angle switch circuit with xMR sensors in accordance with implementations of the present disclosure.

An example implementation of magnetic angle switch circuit 100 which can provide unique angle measurements and switching points in an angular range of 360° is shown in FIG. 4.

Magnetic angle switch circuit 100 of FIG. 4 comprises a magnetic sensor circuit portion 110 and a switch circuit portion 120. In the implementation of FIG. 4, magnetic sensor circuit portion 110 comprises a first voltage divider circuit comprising a first magneto-resistive element 112-1 connected in series to a second magneto-resistive element 112-2. The first magneto-resistive element 112-1 and the second magneto-resistive element 112-2 are connected in series between a supply voltage VDD and ground GND and form a first branch of a Wheatstone bridge. The reference magnetization of first magneto-resistive element 112-1 points upwards in the drawing, while the reference magnetization of second magneto-resistive element 112-2 points downwards in the drawing. The first voltage divider circuit of FIG. 3 is configured to determine the first sensor signal at first sensing node 114-1 which is indicative of a first trigonometric function of the magnetic field angle. The first trigonometric function may be the sine or the cosine of the angle. Magnetic sensor circuit portion 110 further comprises a second voltage divider circuit comprising a third magneto-resistive element 112-3 connected in series to a fourth magneto-resistive element 112-4. The third magneto-resistive element 112-3 and the fourth magneto-resistive element 112-4 are connected in series between the supply voltage VDD and ground GND and form a second branch of the Wheatstone bridge which is connected in parallel to the first branch. The reference magnetization of third magneto-resistive element 112-3 points rightwards in the drawing, while the reference magnetization of fourth magneto-resistive element 112-4 points leftwards in the drawing. The second voltage divider circuit of FIG. 3 is configured to determine the second sensor signal at second sensing node 114-2 which is indicative of a second trigonometric function of the magnetic field angle. The second trigonometric function may be the cosine or the sine of the angle (90°-shifted to the first branch). In some implementations, the magneto-resistive elements 112-1, 112-2, 112-3, 112-4 may be implemented as TMR elements.

The switch circuit portion 120 of FIG. 4 comprises a first comparator circuit 122-1 having a first input 124-1 (non-inverting input) coupled to first sensing node 114-1 of the first voltage divider circuit between the first and the second magneto-resistive elements 112-1, 112-2. First comparator circuit 122-1 also has a second input 124-2 (inverting input) coupled to a first threshold signal indicative of a first predefined angular threshold (threshold 1). The switch circuit 120 of FIG. 4 further comprises a second comparator circuit 122-2 having a first input 126-1 (non-inverting input) coupled to second sensing node 114-2 of the second voltage divider circuit between the third and the fourth magneto-resistive elements 112-3, 112-4. Second comparator circuit 122-2 also has a second input 126-2 (inverting input) coupled to a second threshold signal indicative of a second predefined angular threshold (threshold 2). The threshold signals (threshold 1, threshold 2) can be fixed or set by respective external resistors, for example. Multiple thresholds may enable a turn counter application, for example.

The switch circuit portion 120 also comprises a digital combiner circuit 130 configured to combine a first (binary) output 128-1 of the first comparator 122-1 and a second (binary) output 128-2 of the second comparator 122-1 to obtain the binary signal 108. For example, digital combiner circuit 130 may be configured to combine first binary output 128-1 and second binary output 128-2 according to a logical "AND" operation. That is, only if both binary outputs 128-1 and 128-2 are "high" then the binary signal 108 may be "high", otherwise "low". The skilled person will appreciate that also other combinations of the binary outputs 128-1, 128-2 are conceivable. For example, digital combiner circuit 130 may also use the threshold signals (threshold 1, threshold 2) for more complex combinations.

For example, the switch circuit 120 might also be configured to determine the output signal 108 according to the following, more complex logic:

```
if( sign(Sin) != sign(ThreshSin) )
{
    PrevState;
    //Not in correct half of angle-range => no switching
}
else if((ThreshSin >= 0 && Cos <= ThreshCos) ||
    (ThreshSin <= 0 && Cos >= ThresCos))
{
  1;  //Switch output on
}
else
{
  0;  //Switch output off
}
```

Here, ThreshSin and ThreshCos correspond to the first and second threshold signals, and Sin and Cos correspond to the first and second sensor signals at first and second sensing nodes 114-1, 114-2. In this example, switching would take place only in one half of the rotation. So, it would have a unique switching angle over the full range of 360° [at Arctan(ThreshSin/ThreshCos), or more precisely at Arctan2 (ThreshSin, ThreshCos)].

The magnetic angle switch circuit 100 of FIG. 4 can provide unique angle measurements in a full range of 360° and may have low current consumption and small chip size.

While the previous examples focused on magnetic angle switch circuits employing magneto-resistive elements, the proposed magnetic angle switch concept also works with other magnetic sensor types, such as Hall sensors, for example. An example implementation of magnetic angle switch circuit 100 with Hall sensors is illustrated in FIG. 5.

Figure 5:
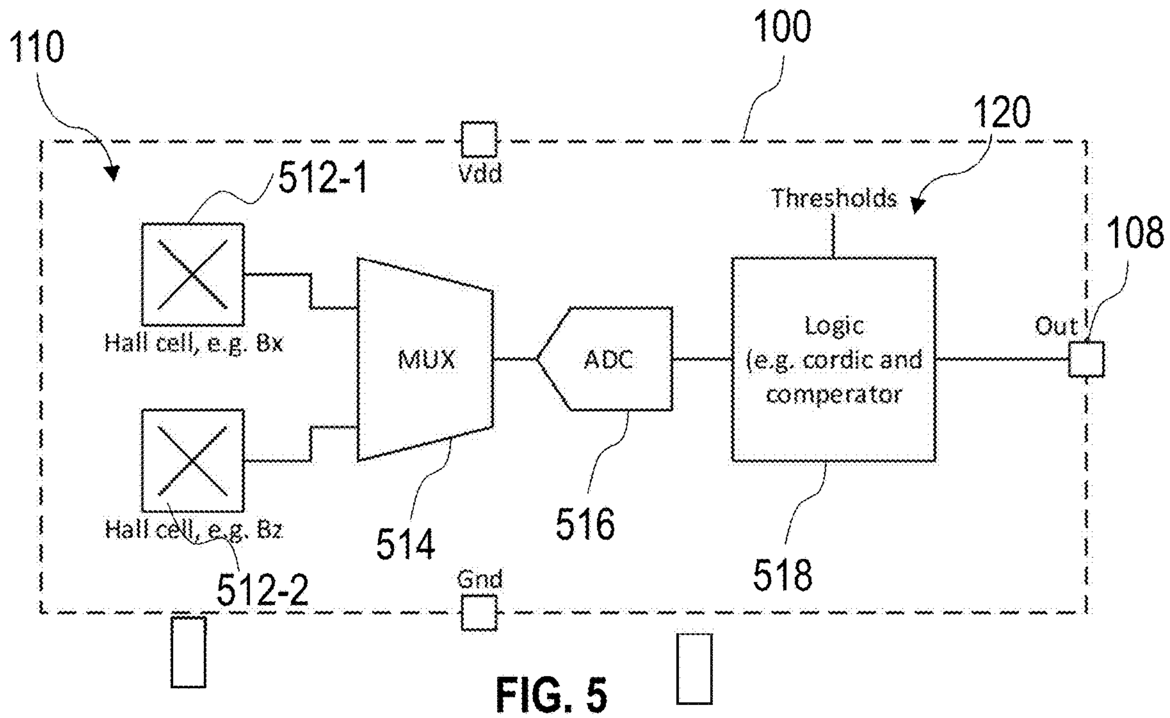
FIG. 5 illustrates a first implementation example of a magnetic angle switch circuit with Hall sensors in accordance with implementations of the present disclosure.

In the example implementation of FIG. 5, the magnetic sensor circuit portion 110 comprises a first Hall sensor 512-1 configured to determine a first sensor signal indicative of a first magnetic field component of the magnetic field (e.g., x-component of magnetic field). Further, magnetic sensor circuit portion 110 comprises a second Hall sensor 512-2 configured to determine a second sensor signal indicative of a second magnetic field component of the magnetic field (e.g., y- or z-component of magnetic field). The first and second magnetic field components are dependent on the angle of the magnetic field at the location of magnetic angle switch circuit 100. The first and second magnetic field components may be dependent on sin- and cos-components of the angle of the magnetic field.

The magnetic sensor circuit portion 110 of FIG. 5 is further configured to determine the sensor signal based on a combination of the first and second sensor signal. In the example of FIG. 5, the first and second sensor signals of first and second Hall sensors 512-1, 512-2 for each angle measurement are multiplexed by multiplexer 514. The multiplexed sensor signal at the output of multiplexer 514 is coupled to an analog-to-digital converter (ADC) 516 which is configured to sample the multiplexed sensor signal for each angle measurement to obtain first and second digital sensor signals (Bx, Bz) for each angle measurement. In this way, digital representations of x- and z-components of the magnetic field may be obtained at an output of ADC 516.

Switch circuit 120 portion of FIG. 5 comprises digital logic circuitry 518 which is configured to determine the binary output signal 108 based on the first and second digital sensor signals (Bx, Bz) coming from ADC 516 and based on at least one predefined angular threshold. For this purpose, digital logic circuitry 530 may implement a CORDIC ("coordinate rotation digital computer") algorithm, for example, and compare its outcome using one or more comparators. For example, the first and second digital sensor signals corresponding to the perpendicular magnetic field components may correspond to sine and cosine of the angle of the magnetic field. The angle of the magnetic field may be determined and compared against the predefined angular threshold. The binary output signal 108 may signal as to whether the angle of the magnetic field is larger or smaller than the predefined angular threshold or is within two different predefined angular thresholds, for example.

Figure 6:
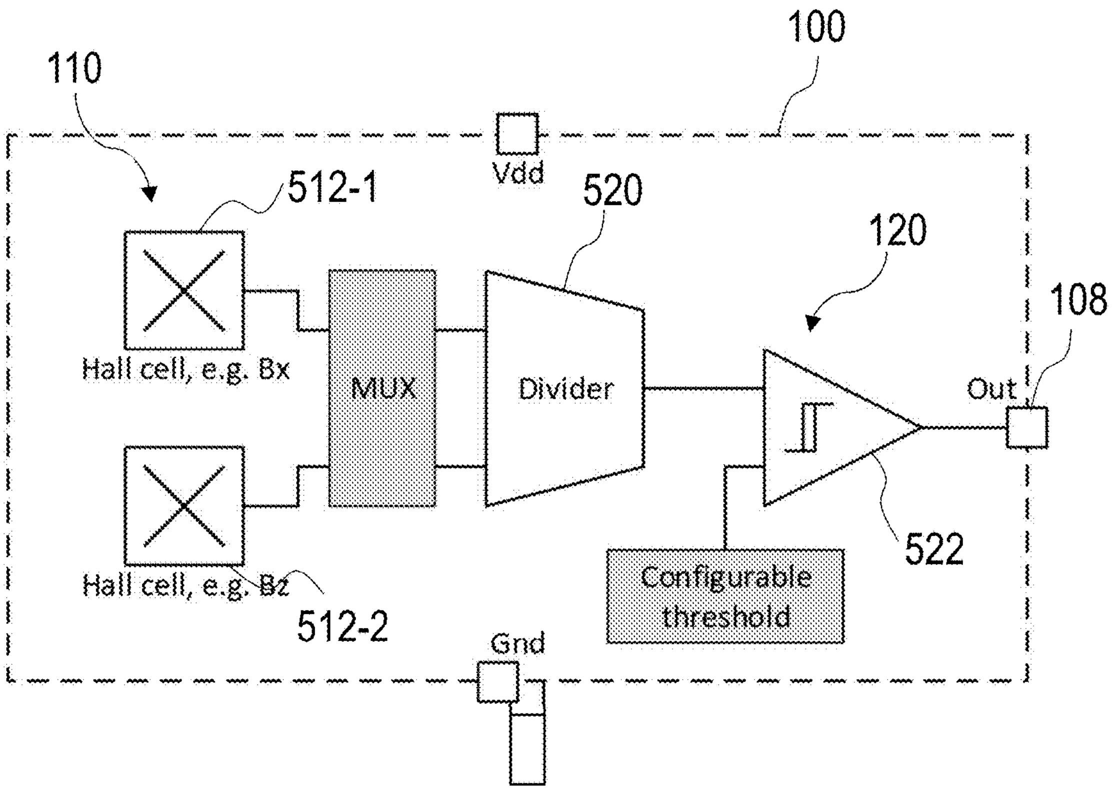
FIG. 6 illustrates a second implementation example of a magnetic angle switch circuit with Hall sensors in accordance with implementations of the present disclosure.

In an alternative and less complex implementation of a magnetic angle switch circuit 100 shown in FIG. 6.

The magnetic sensor circuit portion 110 comprises a first Hall sensor 512-1 configured to determine a first sensor signal indicative of a first magnetic field component of the magnetic field (e.g., x-component of magnetic field). Magnetic sensor circuit portion 110 also comprises a second Hall sensor 512-2 configured to determine a second sensor signal indicative of a second magnetic field component of the magnetic field (e.g., y- or z-component of the magnetic field). The first and second magnetic field components are dependent on a current angle of the magnetic field at the location of magnetic angle switch circuit 100. For example, the first and second magnetic field components may correspond to a sine and cosine component of the current angle.

The magnetic sensor circuit portion 110 of FIG. 6 further comprises an analog divider circuit 520 which is configured to determine the sensor signal based on a division of the first and second sensor signal. For example, the division of the first and second sensor signal may lead to an arctan-signal at an output of divider 520. The output of divider 520 may be compared against a configurable threshold indicative of a predefined angular threshold. This comparison may be done with a comparator 522 of switch circuit portion 120 which outputs binary signal 108 indicative of whether the current angle of the magnetic field exceeds or falls below the predefined angular threshold.

The skilled person having benefit from the present disclosure will appreciate that the Hall-sensors may be used in the implementations described with magneto-resistive sensors, and vice versa. The predefined angular threshold(s) may be adjustable and may be communicated digitally or via analog signals. Alternatively, the predefined angular threshold(s) may be adjusted by mechanically changing a position and or orientation of the magnetic angle switch circuit 100 with regards to the magnet 102. This is illustrated in FIG. 7.

Figure 7:
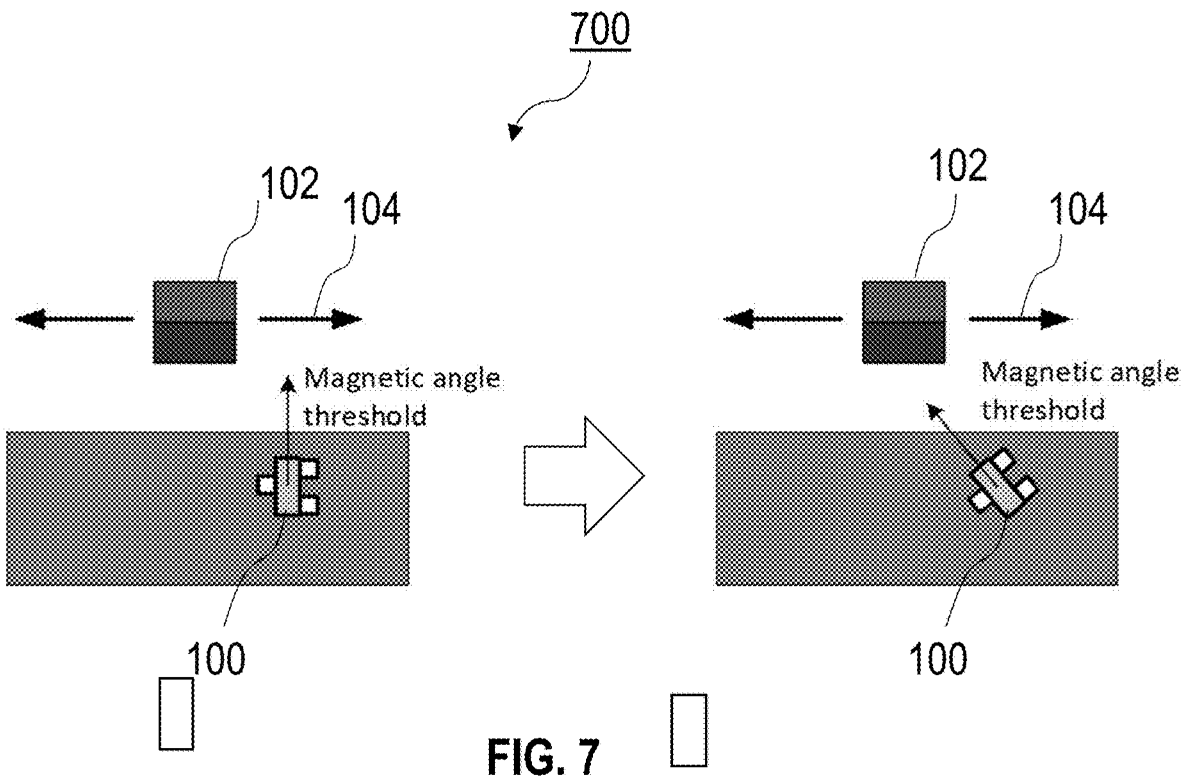
FIG. 7 illustrates an adjustment of an angular threshold by changing an orientation of a magnetic angle switch circuit.

FIG. 7 shows a magnetic angle switch arrangement 700 comprising a movable magnet 102 causing a magnetic field. An actuator (not shown) is configured to move the movable magnet 102 along a straight motion axis 104 (trajectory). The linear movement of the magnet 102 may be a relative movement vis-à-vis magnetic angle switch circuit 100 mounted on a printed circuit board (PCB) at a position in proximity to the trajectory 104 of the movable magnet 102. As shown in FIG. 7, the position and/or orientation of the magnetic angle switch circuit 100 with regards to the magnet 102 or its trajectory 104 may be adjustable. The left portion of FIG. 7 shows magnetic angle switch circuit 100 mounted on the PCB with a 0°-axis (reference axis) of the magnetic angle switch circuit 100 being perpendicular to the trajectory 104 of the movable magnet 102. This means, that the magnetic angle switch circuit 100 would switch its output signal 108 when the magnet 102 passes the 0°-axis of the magnetic angle switch circuit 100. In the left portion of FIG. 7 this is the case when the magnet 102 passes the magnetic angle switch circuit 100 (here: same x-coordinate of magnet 102 and magnetic angle switch circuit 100). The right portion of FIG. 7 shows the magnetic angle switch circuit 100 mounted on the PCB with its 0°-axis (reference axis) being in a 45° angle to the trajectory of the movable magnet 102. This means, that the magnetic angle switch circuit 100 would switch its output signal when the magnetic field direction at the magnetic angle switch circuit 100 is 45°. In the right portion of FIG. 7 this is the case when the magnet 102 passes a point left from the magnetic angle switch circuit 100 (here: x-coordinate of magnet 102<x-coordinate of magnetic angle switch circuit 100). Such a mechanical adjustment of the predefined angular threshold(s) may be achieved by mounting the magnetic angle switch circuit 100 on a rotatable platform, for example.

Figure 8:
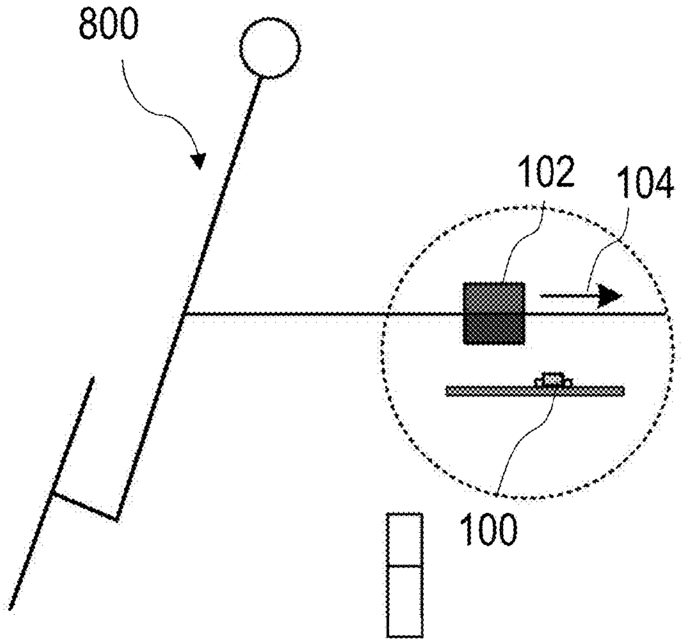
FIG. 8 illustrates the use of magnetic angle switch circuit as brake light sensor.

FIG. 8 illustrates an example use case where a magnetic angle switch circuit 100 in accordance with the present disclosure is used as a brake light sensor. Here, the magnet 102 is mechanically coupled to a braking pedal 800. Braking moves the magnet 102 the right (x-direction) along a straight trajectory 104. When the magnet 102 passes a point where the magnetic field direction at the magnetic angle switch circuit 100 corresponds to a predefined angular threshold (e.g., 0°), the magnetic angle switch is triggered and the break light activated.

Implementations of the present disclosure may provide accurate and robust switching points as well as temperature stability. Further, for magnetic angle switches in accordance with implementations a low cost implementation may be possible.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A magnetic angle switch circuit, comprising:
a magnetic sensor circuit configured to:
determine a sensor signal indicative of an angle of a magnetic field; and
a switch circuit configured to:
compare, when the magnetic angle switch circuit is in an off state, the sensor signal against a first threshold signal,
wherein the first threshold signal is indicative of a first predefined angular threshold,
compare, when the magnetic angle switch circuit is in an on state, the sensor signal against a second threshold signal,
wherein the second threshold signal is indicative of a second predefined angular threshold, and
output a binary signal indicative of whether the angle of the magnetic field exceeds the first predefined angular threshold or falls below the second predefined angular threshold,
wherein, to output the binary signal, the switch circuit is configured to:
output, when the magnetic angle switch circuit is in the off state, a first signal when the sensor signal exceeds the first threshold signal, and
output, when the magnetic angle switch circuit is in the on state, a second signal when the sensor signal falls below the second threshold signal.

2. The magnetic angle switch circuit of claim 1, wherein the magnetic sensor circuit is configured to determine the sensor signal being indicative of at least one trigonometric function of the angle,
wherein the trigonometric function comprises at least one of a sine of the angle or a cosine of the angle.

3. The magnetic angle switch circuit of claim 1, wherein the magnetic sensor circuit is configured to:
determine a first sensor signal indicative of a first trigonometric function of the angle,
determine a second sensor signal indicative of a second trigonometric function of the angle, and
determine the sensor signal indicative of the angle based on the first sensor signal and the second sensor signal.

4. The magnetic angle switch circuit of claim 1, wherein the magnetic sensor circuit comprises:
a first voltage divider circuit comprising a first magneto-resistor connected in series to a second magneto-resistor, and
wherein the switch circuit comprises:
a first comparator circuit having a first input coupled to a first terminal of the magnetic sensor circuit between the first magneto-resistor and the second magneto-resistor, and a second input coupled to the first threshold signal, when the magnetic angle switch circuit is in an off state, or the second threshold signal, when the magnetic angle switch circuit is in an on state.

5. The magnetic angle switch circuit of claim 4, wherein a first reference magnetization of the first magneto-resistor and a second reference magnetization of the second magneto-resistor differ by 180°.

6. The magnetic angle switch circuit of claim 5, wherein the magnetic sensor circuit further comprises:
a second voltage divider circuit comprising a third magneto-resistor connected in series to a fourth magneto-resistor, and
wherein the switch circuit comprises:
a second comparator comprising:
a first input coupled to a second terminal of the magnetic sensor circuit between the third magneto-resistor and the fourth magneto-resistor, and
a second input coupled to a third threshold signal indicative of a third predefined angular threshold.

7. The magnetic angle switch circuit of claim 6, wherein a third reference magnetization of the third magneto-resistor and a fourth reference magnetization of the third magneto-resistor differ by 180°, and
wherein the first reference magnetization and the third reference magnetization differ by 90° and the second reference magnetization and the fourth reference magnetization differ by 90°.

8. The magnetic angle switch circuit of claim 6, further comprising:
a combiner circuit configured to logically combine a first output of the first comparator and a second output of the second comparator to obtain the binary signal.

9. The magnetic angle switch circuit of claim 4, wherein the first magneto-resistor and the second magneto-resistor comprise TMR resistors.

10. The magnetic angle switch circuit of claim 1, wherein the magnetic sensor circuit comprises:
a first Hall sensor configured to determine a first sensor signal indicative of a first magnetic field component of the magnetic field, and
a second Hall sensor configured to determine a second sensor signal indicative of a second magnetic field component of the magnetic field, and
wherein the magnetic sensor circuit is configured to determine the sensor signal based on a combination of the first sensor signal and the second sensor signal.

11. A magnetic angle switch apparatus, comprising:
a movable magnet causing a magnetic field;
an actuator configured to move the movable magnet along a trajectory; and
a magnetic angle switch circuit comprising:
a magnetic sensor circuit configured to determine a sensor signal indicative of an angle of the magnetic field, and
a switch circuit configured to:
compare, when the magnetic angle switch circuit is in an off state, the sensor signal against a first threshold signal,
wherein the first threshold signal is indicative of a first predefined angular threshold,
compare, when the magnetic angle switch circuit is in an on state, the sensor signal against a second threshold signal,
wherein the second threshold signal is indicative of a second predefine angular threshold, and
output a binary signal indicative of whether the angle of the magnetic field exceeds the first predefined angular threshold or falls below the second predefined angular threshold,
wherein, to output the binary signal, the switch circuit is configured to:
output, when the magnetic angle switch circuit is in the off state, a first signal when the sensor signal exceeds the first threshold signal, and
output, when the magnetic angle switch circuit is in the on state, a second signal when the sensor signal falls below the second threshold signal, wherein the magnetic angle switch circuit is located at a position in proximity to the trajectory of the movable magnet, and wherein the magnetic angle switch circuit is configured to output the binary signal in response to the angle of the magnetic field at the position of the magnetic angle switch circuit.

12. The magnetic angle switch apparatus of claim 11, wherein at least one of the position of the magnetic angle switch circuit relative to the magnet is adjustable, or an orientation of the magnetic angle switch circuit relative to the magnet is adjustable.

13. The magnetic angle switch apparatus of claim 11, wherein the magnetic sensor circuit is configured to determine the sensor signal being indicative of at least one trigonometric function of the angle, wherein the trigonometric function comprises at least one of a sine of the angle or a cosine of the angle.

14. The magnetic angle switch apparatus of claim 11, wherein the magnetic sensor circuit is configured to:

determine a first sensor signal indicative of a first trigonometric function of the angle, determine a second sensor signal indicative of a second trigonometric function of the angle, and determine the sensor signal indicative of the angle based on the first sensor signal and the second sensor signal.

15. The magnetic angle switch apparatus of claim 11, wherein the magnetic sensor circuit comprises:

at least a first voltage divider circuit comprising a first magneto-resistor connected in series to a second magneto-resistor, and wherein the switch circuit comprises:

at least a first comparator circuit comprising:

a first input coupled to a first terminal of the magnetic sensor circuit between the first magneto-resistor and the second magneto-resistor, and a second input coupled to the first threshold signal, when the magnetic angle switch circuit is in an off state, or the second threshold signal, when the magnetic angle switch circuit is in an on state.

16. The magnetic angle switch apparatus of claim 15, wherein a first reference magnetization of the first magneto-resistor and a second reference magnetization of the second magneto-resistor differ by 180°.

17. The magnetic angle switch apparatus of claim 16, wherein the magnetic sensor circuit further comprises:

a second voltage divider circuit comprising a third magneto-resistor connected in series to a fourth magneto-resistor, and wherein the switch circuit comprises:

a second comparator comprising:

a first input coupled to a second terminal of the magnetic sensor circuit between the third magneto-resistor and the fourth magneto-resistor, and a second input coupled to a third threshold signal indicative of a third predefined angular threshold.

18. A method for measuring a magnetic angle, performed by a magnetic angle switch circuit, the method comprising:

determining, at the magnetic angle switch circuit, a magnetic sensor signal indicative of an angle of a magnetic field;

comparing, at the magnetic angle switch circuit, the magnetic sensor signal against a threshold signal, wherein the threshold signal is indicative of a predefined angular threshold; and outputting, from the magnetic angle switch circuit, a binary signal indicative of whether the angle of the magnetic field exceeds or falls below the predefined angular threshold, wherein, when the magnetic angle switch circuit is in an off state, the comparing the magnetic sensor signal is against a first threshold signal, which is indicative of a first predefined angular threshold, and the outputting the binary signal is indicative of whether the angle of the magnetic field exceeds the first predefined angular threshold, and wherein, when the magnetic angle switch circuit is in an on state, the comparing the magnetic sensor signal is against a second threshold signal, which is indicative of a second predefined angular threshold, and the outputting the binary signal is indicative of whether the angle of the magnetic field falls below the second predefined angular threshold.

19. The method of claim 18, further comprising:

determining a first sensor signal indicative of a first trigonometric function of the angle of the magnetic field; and determining a second sensor signal indicative of a second trigonometric function of the angle of the magnetic field, wherein the magnetic sensor signal is determined based on the first sensor signal and the second sensor signal.

20. The method of claim 18, further comprising:

obtaining the binary signal based on logically combining a first output of a first comparator of a magnetic angle switch circuit and a second output of a second comparator of the magnetic angle switch circuit.

* * * * *